Jan. 2, 1962 F. MOHWINKEL ET AL 3,015,381
BELT CONVEYORS
Filed Feb. 10, 1958 2 Sheets-Sheet 1

Jan. 2, 1962 F. MOHWINKEL ET AL 3,015,381
BELT CONVEYORS
Filed Feb. 10, 1958 2 Sheets-Sheet 2
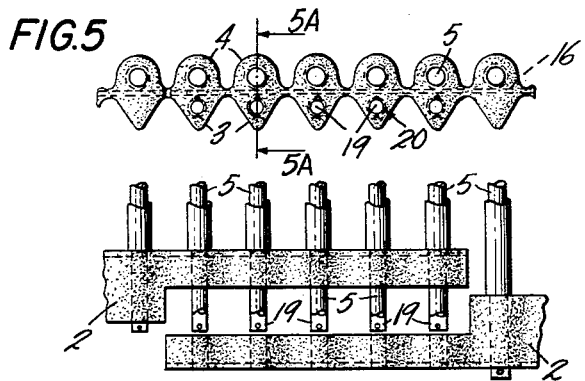
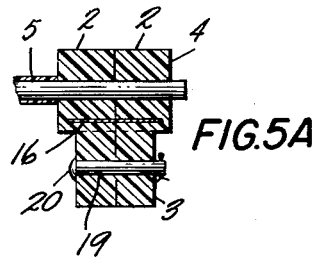
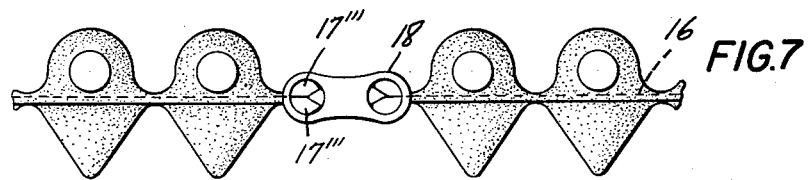
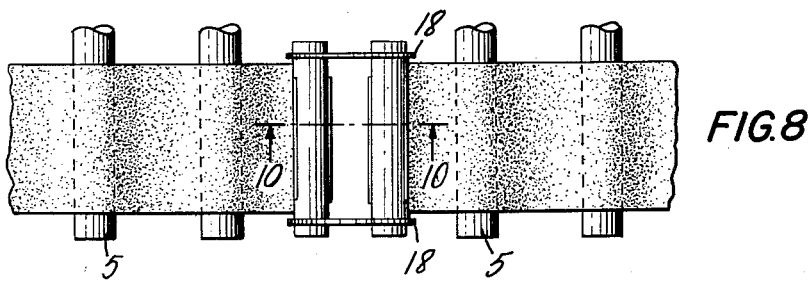
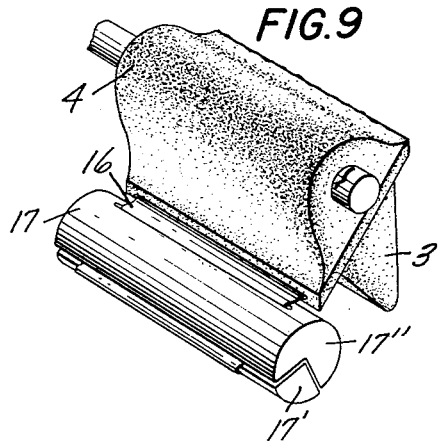
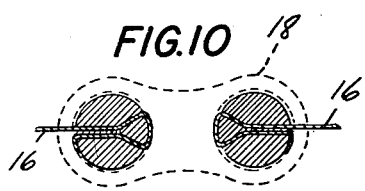

United States Patent Office 3,015,381
Patented Jan. 2, 1962

3,015,381
BELT CONVEYORS
Franz Mohwinkel, Soltau-Ahlften, and Helmut Funke, Hannover, Germany; said Funke assignor to said Mohwinkel
Filed Feb. 10, 1958, Ser. No. 714,332
Claims priority, application Germany Feb. 14, 1957
2 Claims. (Cl. 198—203)

This invention relates to belt conveyors of the rod type, such as often fitted upon agricultural machines, such for example as potato-harvesting machines and lifters, the conveyor belts consisting of rods extending transversely between open-link chains at the opposite edges of the belt. The two chains thus bridged-over by the transverse rods, form a belt conveyor which also sieves the harvested material. Such belts are subject to great wear, for the belt, as may be understood, takes up damp earth with the crop, and this constantly wears away the joints of the chain links.

The invention has for its main object to remove this defect by the provision of a conveyor belt substantially free of open-link chains, but having its edges formed by two toothed belts, bridged over by rods, the ends of which are secured in each case to the toothed belts.

Other objects and advantages of the invention will hereinafter appear from the following description, given with reference to the accompanying drawings, in which:

FIG. 5 is a side view of the connection between the two ends of our conveyor belt, the ends being oppositely cut away to half width and abutted against one another;

FIG. 5A is a cross-sectional view along line 5A—5A of FIGURE 5;

FIG. 6 is a plan of the connection seen in FIG. 5, before the over-lapping engagement of the belt ends;

FIG. 7 is a side view of our conveyor belt, showing wedge-clamp anchorages for the steel strip insert;

FIG. 8 is a plan of FIG. 7;

FIG. 9 is a perspective view of the wedge-clamp anchorage for the insert at one end of the belt; and FIG. 10 is a side view showing the connection of the insert at two ends of the belt.

Figure 1:
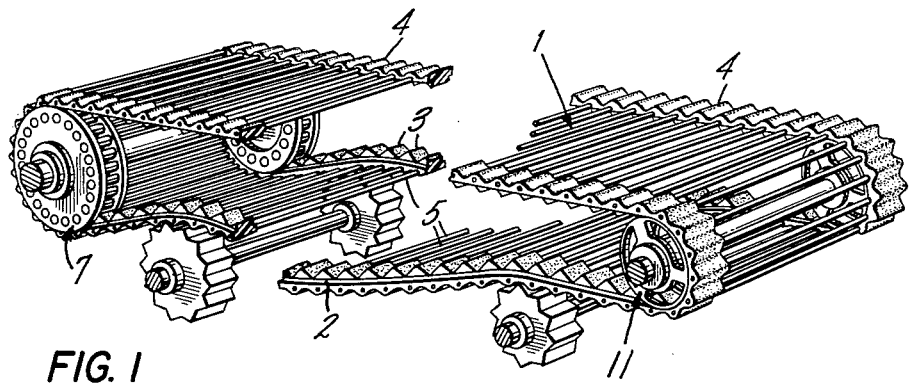
FIG. 1 represents our endless conveyor belt running over belt pulleys, with two driving toothed wheels at one end and two guide wheels at the other end.
Figure 2:
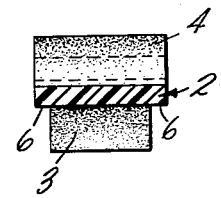
FIG. 2 is a cross-section of the belt.

As illustrated in FIGS. 1 and 2, the conveyor belt 1 comprises two toothed belts 2, at its opposite side edges; each of these belts has internal teeth 3 for engagement with the driving wheels, and external blocks 4 in which the transverse rods 5 are engaged. Each of these belts 2 may consist of rubber or synthetic plastic material, which is reinforced by steel inserts, as hereinafter described. The inside of the belt, which runs on the toothed wheels 7 and 11, has the teeth 3 arranged transversely. The reinforcing steel insert may consist of numerous thin steel cables distributed over the cross-section of the belt, or of a steel strip 16, as shown in FIGS. 5 to 10 hereinafter described.

The conveyor belt, as seen from FIG. 1, has such a toothed belt 2 on each side edge, and has the transverse rods 5 bridging over between the two toothed belts 2, the ends of said rods being secured in each case on the untoothed rear surface, as by embedding their ends in the blocks 4.

The conveyor belt can however possess at its edges, instead of the toothed belts 2, block-toothed belts made of rubber or synthetic plastic material with steel inserts in the cross-section of the actual belt; the latter is fitted on one side with blocks, preferably hollow, in which the ends of the transverse rods 5 are engaged. These rods 5, which bridge over the two toothed or block-toothed belts 2, may be coated with rubber, if they are of steel, in order not to damage delicate material being transported.

These rod-type conveyor belts run with complete satisfaction in agricultural implements, if their toothed belts 2 and the pulleys for the latter are so designed and adapted to one another that the earth picked up is satisfactorily stripped off on the belt pulleys, and the conveyor belt maintains its track.

Figure 3:
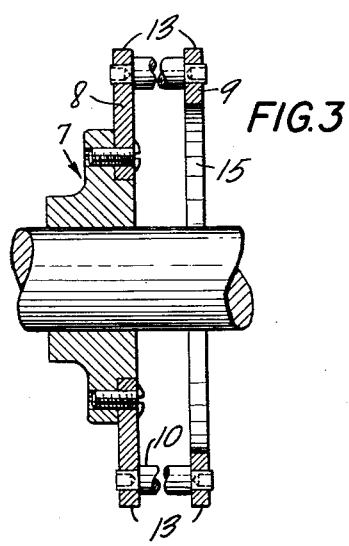
FIG. 3 is a cross-section through one of the driving toothed wheels.
Figure 4:
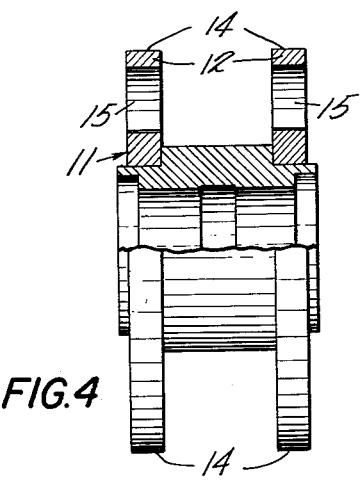
FIG. 4 is a half-section through one of the guide wheels.

For this purpose, the toothed belt is driven by a pulley 7, such as shown in FIG. 3, consisting of two perforated discs arranged with the spacing of the tooth length, or one disc 8 and a ring 9 spaced therefrom by bolts 10 each having one tooth-length, the peripheral surfaces 13 of which serve as supports for the running bands 6 (FIG. 2) of the toothed belt 2. The holes 15 in the discs or the internal diameter of the ring 9 secured to the disc 8 are made so wide that the earth carried by the belt satisfactorily drops out of the available holes and apertures during the running of the belt. Similarly, the toothed belt is guided by a belt pulley 11, such as shown in FIG. 4, having two running rings 12 separated by a gap. Upon the faces 14 of the pulley there run the running bands 6 of the toothed belt 2. Any earth carried by the toothed belts and stripped off on the belt pulley is forced through the gap between the two running surfaces of the belt pulley, and drops out through holes 15 in the pulley rings or the clear aperture of the running ring mounted on the pulley. Thus it cannot disturb the satisfactory running of the conveyor belt.

The blocks 4 arranged on the toothed belt 2, and mounted on the outer face of the belt, can extend over the entire width of the belt, since they do not come into engagement with the belt pulleys.

An endless conveyor belt of rod type, the edges of which comprise endless toothed or block-toothed belts, can as a rule be placed upon the belt pulleys only from one side, without dismantling the machine installation for this purpose; not all machine installations are so constructed that the belt can be placed upon the belt pulleys from the side. Then the placing of a toothed driving belt 2 upon the belt pulleys 7 and 11 may be very difficult and complicated, on account of the necessary dismantlement.

In order to provide toothed driving belts 2, the ends of which, despite the steel insert 16, can be operatively connected with one another, without any dismantling of the machine, the belt ends can be cut away in opposite directions to half width, with accurate fit for the operative junction, and overlapped from the side, as shown in FIGS. 5 and 6. Furthermore the last tooth at each end of the belt will be provided with a passage arranged transversely of the belt and intended to receive the connecting means. Alternatively there may be correspondingly worked in each of several last teeth, at each end of the toothed driving belt, a passage so that a plurality of teeth are used to receive the connecting means. Preferably steel sleeves or bushes are inserted into these passages in or after the production of the belt. With the ends of the passages or sleeves then abutting against one another, the teeth are traversed, as shown, by steel bolts, whereby the laterally overlapping ends of the belt are operatively united, the ends of the steel bolts being provided with the conventional washers and cotters or nuts. As shown in FIGS. 5 and 6, the last five teeth 3 on each belt end have passages 19 for the reception of the steel bolts 20, which have holes at the ends for the reception of cotter pins or the like.

The belts 2 can alternatively be operatively connected by means of a wedge-clamp anchorage such as shown in FIGS. 7 to 10. This anchorage consists for example of a bolt 17, divided longitudinally into two or three segments, 17', 17'', 17''', the two bolts 17 being connected by shackles 18.

The steel strip is here taken in loop fashion around the bolt segment 17', and clamped fast by means of the other segment or segments. The bolt may be divided into two segments, in which case the second segment is slotted and the steel strip 16 is conducted through the slot, placed around the second segment 17' and led back through the slot. Alternatively the bolt may be divided into three segments. The connecting shackle 18 can be prolonged upwards and its extension provided with an aperture for the reception of one of the transverse rods 5.

With the descrbed arrangement of the belt pulleys and with this construction of the conveyor belt, the latter is securely guided by the belt pulleys. Therefore the conveyor belt cannot run down off the belt pulleys, however much earth it has picked up.

It will be understood that the conveyor belt may have its two edges fitted with toothed belts 2 having steel inserts 16, and the untoothed sides of these belts being bridged over by rods 5, which are secured thereon for example with rivets. The belts are united at their ends by suitable means to form endless belts.

What we claim and desire to secure by Letters Patent is:

1. In a conveyor system for conveying root crops, an improved endless conveyor having an upper and a lower run and comprising in combination; endless parallel belts of reinforced flexible material transversely spaced apart, each said belt having inner and outer surfaces and side edges, said outer surface having regularly-spaced transverse blocks defining transverse holes and said inner surface having smooth running bands adjacent the side edges and regularly-spaced transverse teeth extending between said running bands; a plurality of rods extending between said endless belts and engaged in said holes of the upper surface blocks; a pair of pulleys, for each said endless belt, mounted for rotation about parallel axes and defining said upper and lower runs of said conveyor, each said pulley having open sides and radially extending rims, said rims being axially spaced apart at least the transverse extent of said teeth to respectively engage the smooth running bands of said belt.

2. An improved endless conveyor as described in claim 1, characterized in that each pair of said pulleys comprise a driving pulley and a guide pulley, said driving pulley comprising a perforated disk, a ring of the same outer diameter as said disk, spacing bolts rigidly attaching said ring to said disk and axially spacing said disk and ring, said bolts being spaced around a circumference of said disk and ring to engage said teeth to drive said belt when said driving pulley is rotated.

References Cited in the file of this patent
UNITED STATES PATENTS

| | | |
|---|---|---|
| 331,703 | Grater et al. | Dec. 1, 1885 |
| 1,581,075 | Miller | Apr. 13, 1926 |
| 2,244,827 | Crawford | June 10, 1941 |
| 2,290,456 | Stilwell | July 21, 1942 |
| 2,753,039 | Velten et al. | July 3, 1956 |
| 2,753,980 | Ballard | July 10, 1956 |
| 2,770,977 | Beckadolph | Nov. 20, 1956 |
| 2,778,480 | Dobbins | Jan. 22, 1957 |